United States Patent
Blank

(10) Patent No.: US 11,971,073 B2
(45) Date of Patent: Apr. 30, 2024

(54) ROTARY SHIFTER ASSEMBLY

(71) Applicant: KA Group AG, Zürich (CH)

(72) Inventor: David Blank, Mullsjö (SE)

(73) Assignee: KA Group AG, Zürich (CH)

(*) Notice: Subject to any disclaimer, the term of this patent is extended or adjusted under 35 U.S.C. 154(b) by 363 days.

(21) Appl. No.: 17/424,756

(22) PCT Filed: Jan. 22, 2020

(86) PCT No.: PCT/IB2020/050505
§ 371 (c)(1),
(2) Date: Jul. 21, 2021

(87) PCT Pub. No.: WO2020/152608
PCT Pub. Date: Jul. 30, 2020

(65) Prior Publication Data
US 2022/0136572 A1  May 5, 2022

Related U.S. Application Data

(60) Provisional application No. 62/795,081, filed on Jan. 22, 2019.

(51) Int. Cl.
*F16H 59/02* (2006.01)
*F16D 43/202* (2006.01)
*F16H 59/08* (2006.01)

(52) U.S. Cl.
CPC ..... *F16D 43/2028* (2013.01); *F16H 59/0217* (2013.01); *F16H 59/08* (2013.01); *F16H 2059/081* (2013.01)

(58) Field of Classification Search
CPC ................ F16H 59/08; F16H 59/0217; F16H 2059/081; F16D 43/2028
(Continued)

(56) References Cited

U.S. PATENT DOCUMENTS 6,613,997 B2   9/2003  Oster et al.
7,834,865 B2  11/2010  Jannasch et al.
(Continued)

FOREIGN PATENT DOCUMENTS

| DE | 102012219803 A1 | 4/2014 |
|---|---|---|
| KR | 20100090826 A | 8/2010 |
| WO | 2018101907 A1 | 6/2018 |

OTHER PUBLICATIONS

International Search Report for Application No. PCT/IB2020/050505 dated Aug. 25, 2020, 3 pages.
(Continued)

*Primary Examiner* — T. Scott Fix
(74) *Attorney, Agent, or Firm* — Howard & Howard Attorneys PLLC

(57) ABSTRACT

A rotary shifter assembly for changing gears in a vehicle transmission includes a shaft (16) that is rotatably supported in a housing (12) and movable between radial positions for indicating a gear change. A shift knob (10) is coupled to a first end of the shaft for actuation by a user. A plurality of flexible locking fingers (40) extend from the second end, and an overload wheel (18) is disposed about the fingers. The fingers engage the wheel to couple it with the shaft for concurrent rotation. A locking mechanism (64) engages the wheel to selectively prevent and allow concurrent rotation of the wheel and shaft during normal operation. The fingers move relative to the wheel to permit temporary rotation of the shaft relative to the wheel when a force applied to the shaft is beyond a maximum torque threshold, and automatically return to concurrent rotation with the wheel once the force is below the threshold.

24 Claims, 16 Drawing Sheets

(58) Field of Classification Search
USPC .......................................................... 74/473.3
See application file for complete search history.

(56) References Cited

U.S. PATENT DOCUMENTS

| | | | |
|---|---|---|---|
| 9,777,813 | B2 | 10/2017 | Rake et al. |
| 9,835,245 | B2 | 12/2017 | Lee et al. |
| 11,530,744 | B2 * | 12/2022 | Spratte .................... F16H 59/08 |
| 2016/0245396 | A1 | 8/2016 | Behounek et al. |
| 2016/0312882 | A1 | 10/2016 | Heo et al. |
| 2018/0259062 | A1 | 9/2018 | Wang et al. |
| 2018/0259067 | A1 | 9/2018 | Wang et al. |

OTHER PUBLICATIONS

Invitation to Pay Additional Fees and Partial International Search Report for Application No. PCT/IB2020/050505 dated Apr. 20, 2020, 16 pages.

Computer-generated English language abstract for DE 10 2012 219 803 A1 extracted from espacenet.com database on Jul. 26, 2021, 2 pages.

English language abstract for KR 2010-0090826 A extracted from espacenet.com database on Jul. 26, 2021, 1 page.

* cited by examiner

ROTARY SHIFTER ASSEMBLY

CROSS-REFERENCE TO RELATED APPLICATION

This application is the National Stage entry of International Patent Application No. PCT/IB2020/050505, filed Jan. 22, 2020, which claims the benefit of U.S. Provisional Patent Application No. 62/795,081, filed Jan. 22, 2019, which is hereby incorporated by reference in its entirety.

BACKGROUND OF THE INVENTION

1. Field of the Invention

The present disclosure relates generally to rotary shifter assemblies.

2. Description of the Related Art

Conventional automotive powertrain systems known in the art include an engine in rotational communication with a transmission. The engine generates rotational torque which is selectively translated to the transmission which, in turn, translates rotational torque to one or more wheels to drive a vehicle. The transmission multiplies the rotational speed and torque generated by the engine through a series of predetermined gear sets, whereby changing between gear sets enables the vehicle to travel at different vehicle speeds for a given engine speed. Thus, the gear sets of the transmission are configured such that the engine can operate at particularly desirable rotational speeds so as to optimize performance and efficiency.

There are a number of different types of automotive transmissions known in the art. As such, changing between gear sets can be accomplished in a number of different ways, depending on the type of transmission. For example, so-called "manual" transmission systems typically include a clutch disposed between the engine and transmission for modulating engagement therebetween, and a shifter for changing between gear sets. The clutch and shifter are both mechanically connected to the manual transmission and are driver-actuated. In operation, the driver can manipulate the clutch and shifter to move the transmission between a freewheel "neutral" configuration, a "reverse" gear, and one or more forward gears, such as "first," "second," "third," "fourth," etc. Thus, the driver determines when to change between gear sets and operates the shifter and clutch "manually".

So-called "automatic" transmission systems, on the other hand, require substantially less driver input and use an electronic transmission controller that drives one or more solenoids to effect changing between forward gear sets. Solenoids are also used to modulate engagement between the engine and transmission. In conventional automatic transmission systems, modulation is achieved using a hydraulic torque converter. However, modern transmission systems may replace the torque converter with one or more electronically and/or hydraulically actuated clutches (sometimes referred to in the art as a "dual clutch" automatic transmission). In addition, conventional manual transmissions may be automated, whereby electronic actuators are used to shift between gear sets and modulate the clutch without relying exclusively on operator interaction. Irrespective of how modulation is effected, automatic transmission systems rely on the transmission controller to determine when to change between forward gear sets. Thus, the transmission controller "automatically" modulates engagement between the engine and transmission and shifts between forward gear sets.

Despite the convenience afforded by automatic transmission systems in changing between forward gear sets, driver interaction is still required to select between different vehicle operating modes, such as "park," "reverse," "neutral," "drive," and/or "sport/manual." To that end, the automatic transmission system also includes a shifter assembly in communication with the transmission and/or transmission controller.

Historically, shifter assemblies used with automatic transmissions were mechanically connected to the transmission via one or more linkages and/or cables. However, given the trend in the art of utilizing electronic actuators to control automatic transmission systems, modern shifter assemblies are increasingly designed as "drive-by-wire" so as to control the transmission electronically and without mechanical linkages and/or cables. By eliminating mechanical linkages and cables connected to the transmission, electronic shifter assemblies provide significant advantages with respect to packaging size, weight, orientation, and placement within the vehicle. Moreover, electronic shifter assemblies provide opportunities for controlling transmission systems with enhanced functionality and features.

There are some disadvantages with respect to using known electronic shifter assemblies due to operator error. One such disadvantage occurs when extreme torque is applied to the gear shifter by the user, which can occur, for example, when one of the parts of the shifter assembly is stuck or otherwise not operating properly. The user attempts to shift the gears using the shifter and over-rotates the shifter when the desired gear is not achieved. This can result in inoperability of the shifter assembly or even breakage of one or more of the parts of the shifter assembly. The inability of a user (e.g., a driver of the vehicle) to operate the shifter assembly or drive the vehicle may result in endangerment of the user.

Therefore, there is a need for an improved rotary shifter assembly to address one or more deficiencies in known electronic shifter assemblies.

SUMMARY OF THE DISCLOSURE

The present invention overcomes the disadvantages in the related art in a rotary shifter assembly for changing gears in a vehicle transmission. The rotary shifter assembly includes a housing and a shaft that is rotatably supported in the housing. The shaft is selectively movable between a plurality of radial positions for indicating a desired gear change. The shaft has a first end and a second end. The rotary shifter assembly further includes a shift knob coupled to the first end of the shaft for actuation by a user to the desired gear change. The rotary shifter assembly further includes a plurality of locking fingers extending from the second end of the shaft. The rotary shifter assembly further includes an overload wheel that is at least partially disposed about the locking fingers. The locking fingers directly engage the wheel to couple the wheel with the shaft for concurrent rotation as a unit during normal operational modes for performing the desired gear change. The rotary shifter assembly further includes a locking mechanism for engaging the overload wheel to selectively prevent and allow the concurrent rotation of the wheel and the shaft during normal operational modes. The locking fingers are flexible and capable of moving relative to the wheel to permit temporary rotation of the shaft relative to the wheel when a force applied to the shaft is beyond a maximum torque threshold.

In this way, the shifter assembly of the present invention provides improved functionality and usability in connection with automatic transmission systems and, at the same time, reduces instances of parts breakage and failure.

DETAILED DESCRIPTION

Figure 1:
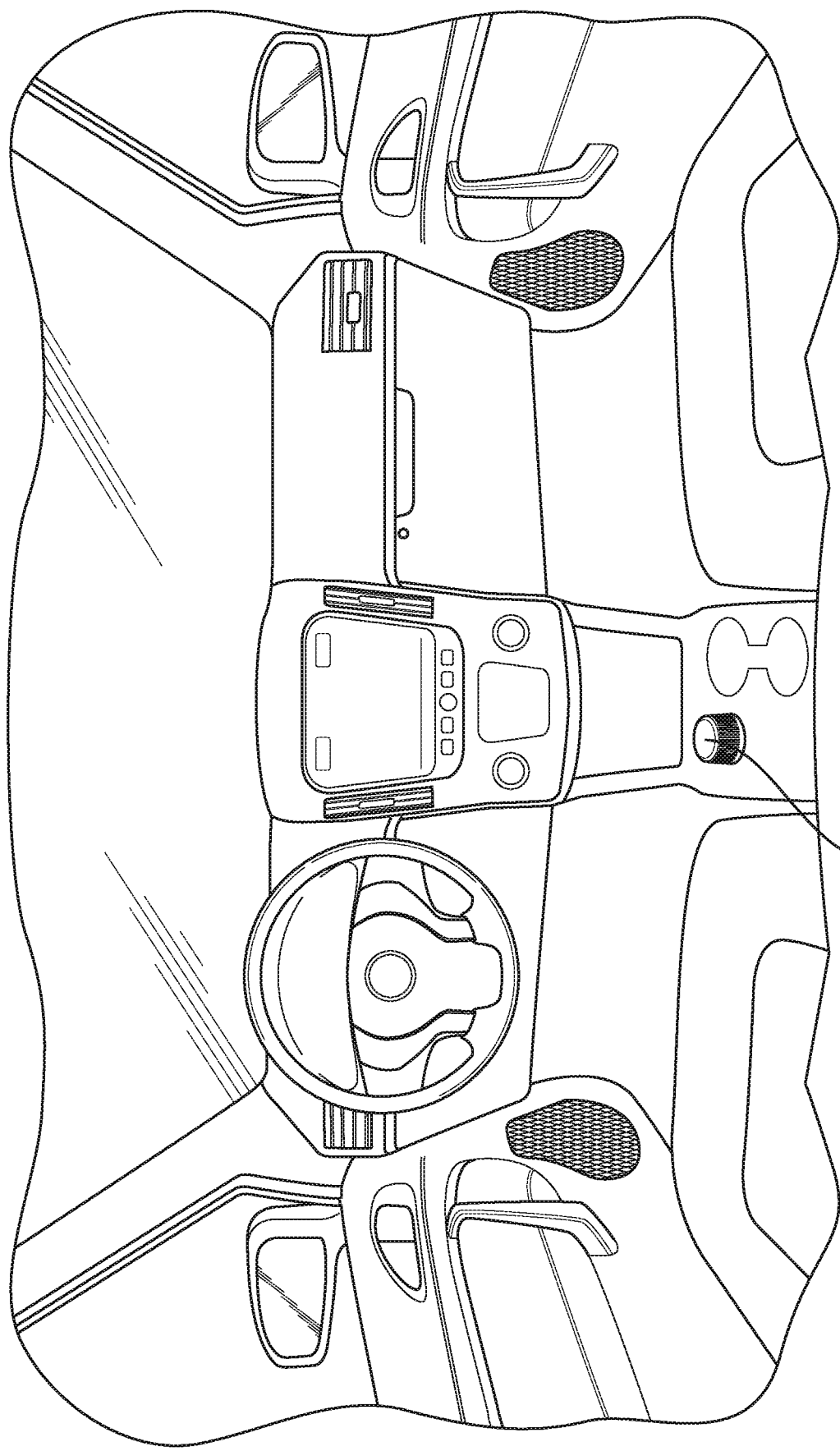
FIG. 1 is a perspective view of an interior of a vehicle including a rotary shifter assembly.

Referring now to the drawings, wherein like numerals indicate corresponding parts throughout the several views, embodiments of a rotary shifter assembly or shifter unit are shown throughout the figures and described in detail below.

Referring now to FIG. 1, a perspective view of an interior of a vehicle including a rotary shifter assembly or shifter unit is shown. A shift knob 10 is exposed within a passenger compartment of a vehicle and is usable by a vehicle operator to actuate movement of the rotary shifter assembly 14 to a desired gear change for controlling a vehicle transmission system.

Figure 2:
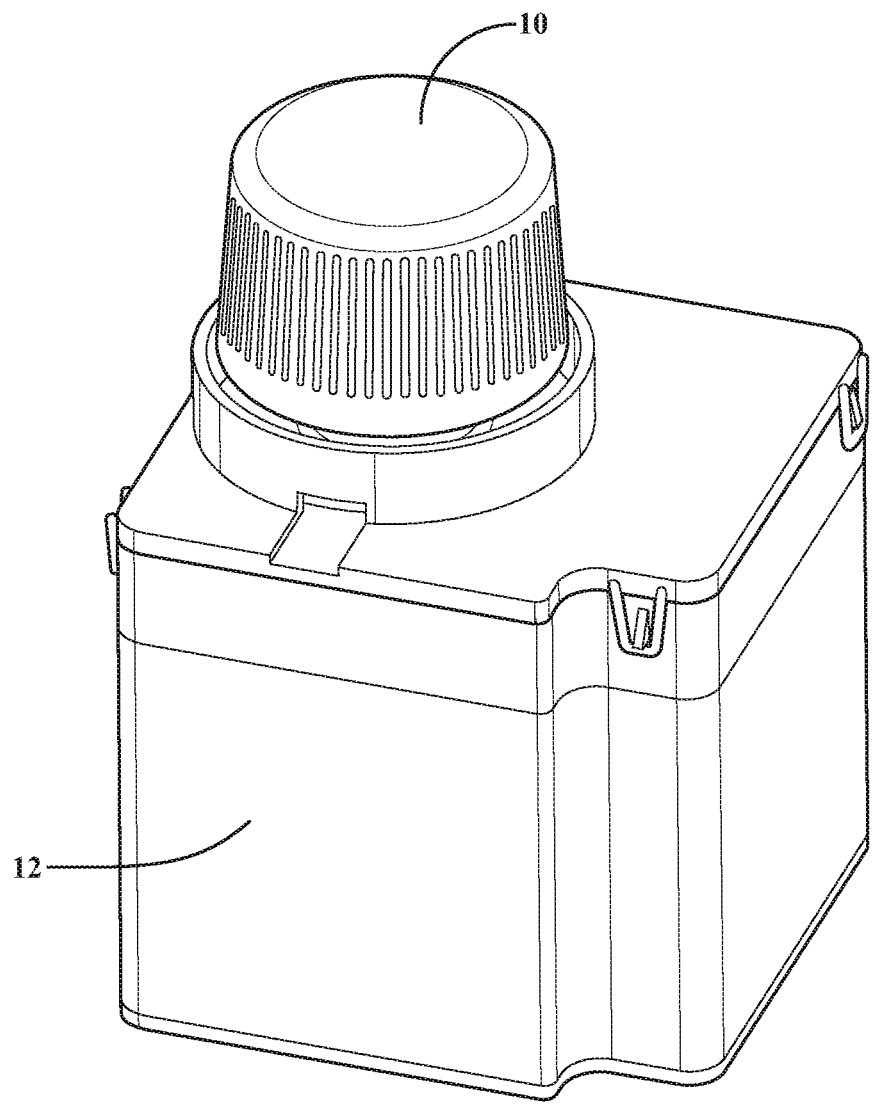
FIG. 2 is a perspective view of a housing according to one embodiment of the present invention.

Referring now to FIG. 2, a perspective view of a housing according to one embodiment of the present invention is shown. The housing 12 supports the shift knob 10 coupled to the rotary shifter assembly 14. The rotary shifter assembly 14 is partially contained within the housing 12.

The rotary shifter assembly 14 may be used for changing gears of a vehicle transmission system, such as an automatic transmission system. For example, the rotary shifter assembly 14 may be used, by an operator of the vehicle, to operate the transmission in a number of operating modes, such as a park mode for parking the vehicle, a drive mode for moving the vehicle in a forward direction, a reverse mode for moving the vehicle in a backward direction, and a neutral mode for disengaging the transmission. Alternatively, the rotary shifter assembly 14 could be used to operate other types of transmission systems, not limited to an automatic transmission system.

Figure 3:
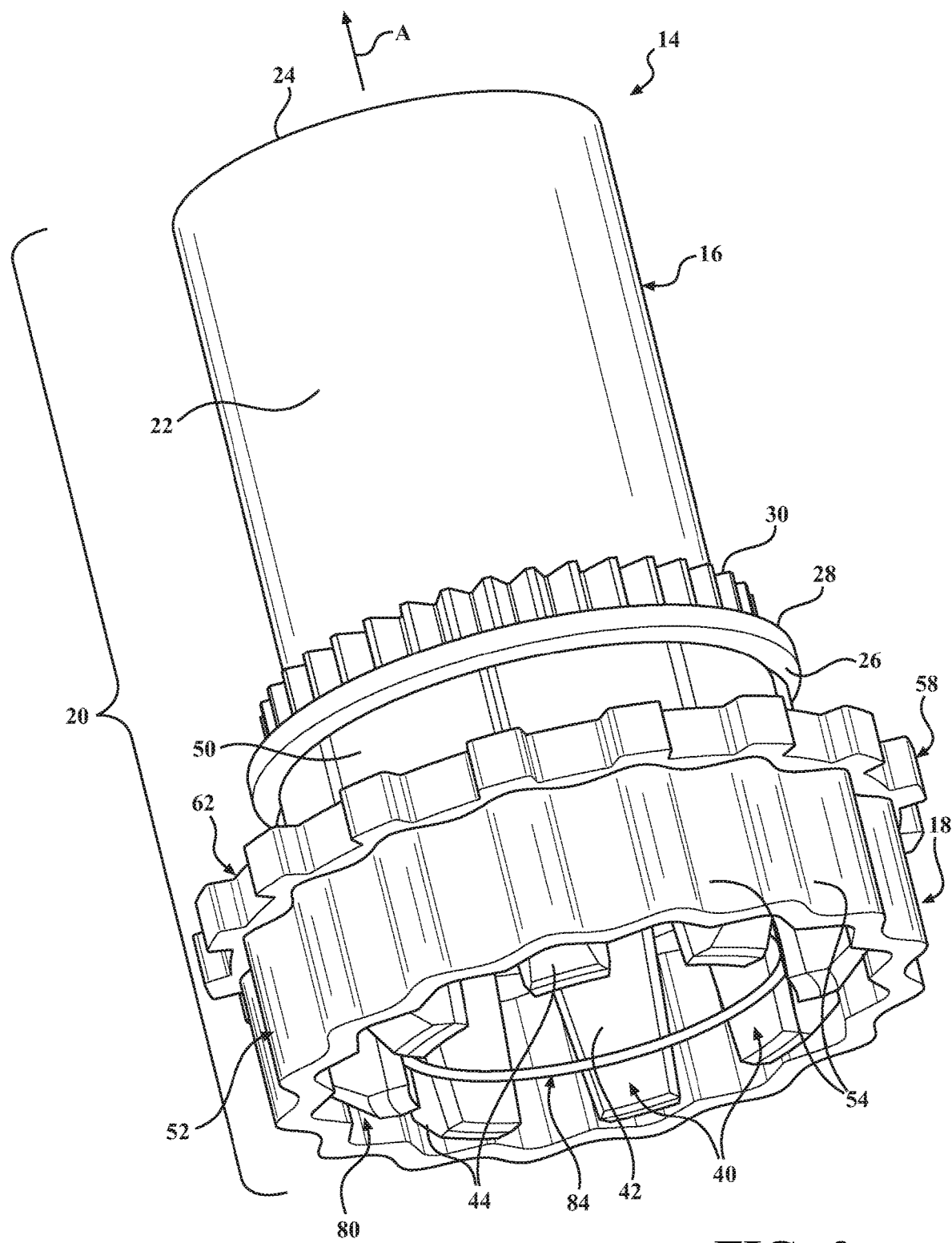
FIG. 3 is a perspective view of a rotary shifter assembly according to an embodiment of the present invention.

Referring now to FIG. 3, a perspective view of the rotary shifter assembly or shifter unit according to an embodiment of the present invention is shown. The rotary shifter assembly 14 includes a central shaft 16 rotatably supported within housing 12, which has a front cover 12a and a rear cover 12b. The central shaft 16 is selectively movable between a plurality of radial positions for indicating a desired gear change. The rotary shifter assembly 14 further includes a ratchet wheel, otherwise referred to as an overload wheel 18 coupled to the central shaft 16. The central shaft 16 and the overload wheel 18 together form a shifter sub-unit 20. The shifter sub-unit 20 may be contained entirely within the housing 12 (see FIGS. 9-10).

The central shaft 16 has a body 22 defining a longitudinal axis A and having a first end 24 and a second end 26. The body 22 may have any suitable configuration, length, and/or size. In the illustrated embodiment, the body 22 has a cylindrical configuration. The body 22 may be hollow or solid. In a preferred embodiment, the body 22 is hollow. The body 22 is adapted to receive and support a shift knob 10 of the rotary shifter assembly 14. Typically, the shift knob 10 is mounted to the first end 24 of the body 22.

Figure 4:
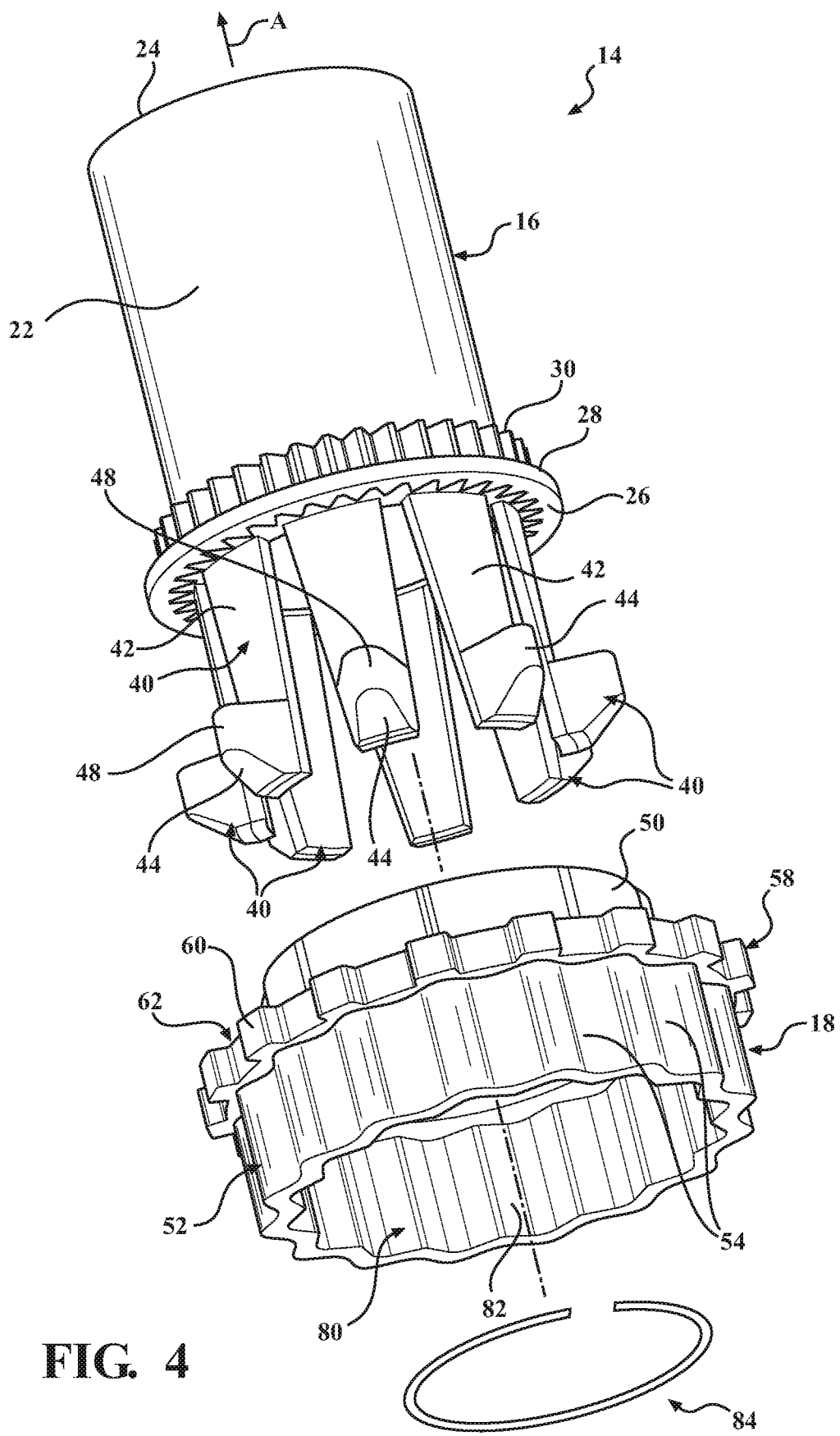
FIG. 4 is an exploded perspective view of the rotary shifter assembly.

Referring now to FIG. 4, an exploded perspective view of the rotary shifter assembly is shown. The central shaft 16 has a flange 28 extending outwardly from the body 22 proximate the second end 26. The flange 28 also extends at least partially around the body 22. The central shaft 16 further has a plurality of teeth 30 extending outwardly from the body 22 adjacent the flange 28. The teeth 30 also extend at least partially around the body 22.

The central shaft 16 further has a plurality of flexible locking fingers 40 extending from the second end 26 of the body 22 along the longitudinal axis A. The locking fingers 40 may be separate from but coupled to the central shaft 16, rather than a continuous extension of central shaft 16. The locking fingers 40 are capable of moving relative to the overload wheel 18 to permit temporary rotation of the central shaft 16 relative to the overload wheel 18 when a force applied to the central shaft 16 is beyond a maximum torque threshold (see FIGS. 13-14). The central shaft 16 automatically returns to concurrent rotation with the wheel 18 once the force is below the maximum torque threshold. Thus, in operation, a user (e.g., a driver of the vehicle) may override a mechanical lock in case of a rotary shifter malfunction or other critical situations. The shifter sub-unit 20 and the shaft with the emitter will continue to function and the vehicle may still be driven while in this mode. Once the force is below the maximum torque threshold, the central shaft 16 automatically returns to concurrent rotation relative to the overload wheel 18.

The overload wheel 18 is at least partially disposed about the locking fingers 40. The locking fingers 40 engage the overload wheel 18 to couple the central shaft 16 to the overload wheel 18 to form the shifter sub-unit 20. During normal operation of the shifter assembly 14, the shifter sub-unit 20 rotates between positions corresponding to the operating modes of the vehicle transmission system. During irregular operation of the shifter assembly 14, such as when an extreme torque is applied to the central shaft 16, the locking fingers 40 are configured to move relative to the overload wheel 18 to temporarily detach the central shaft 16 from the overload wheel 18. When detached, the central shaft 16 is rotatable about the longitudinal axis A relative to the overload wheel 18. Further details of the operations of the shifter assembly 14 are described below with reference to FIGS. 13-14.

Referring again to FIG. 4, each locking finger 40 has a stem 42 and a head 44 extending from the stem 42. The stem 42 may have any suitable configuration and any suitable length. Additionally, the stem 42 may be flat or may be curved to follow the contour of an inner surface 46 of the overload wheel 18 (see FIG. 12). The stem 42 is configured to flex inwardly toward a center of the central shaft 16 to enable the temporary disengagement of the fingers 40 from the overload wheel 18 and permit rotational movement of the central shaft 16 relative to the overload wheel 18 during an irregular operation of the shifter assembly 14. The head 44 of each locking finger 40 may have any suitable configuration and defines an engaging surface 48 that faces away from the center of the central shaft 16. The engaging surface 48 is configured to engage the overload wheel 18 to couple the central shaft 16 to the overload wheel 18 to form the shifter sub-unit 20. The overload wheel 18 has a base portion 50 defining the inner surface 46. The overload wheel 18 further has a detent track 52 extending from the base portion 50 and including a plurality of radially spaced detents 54.

Figure 5:
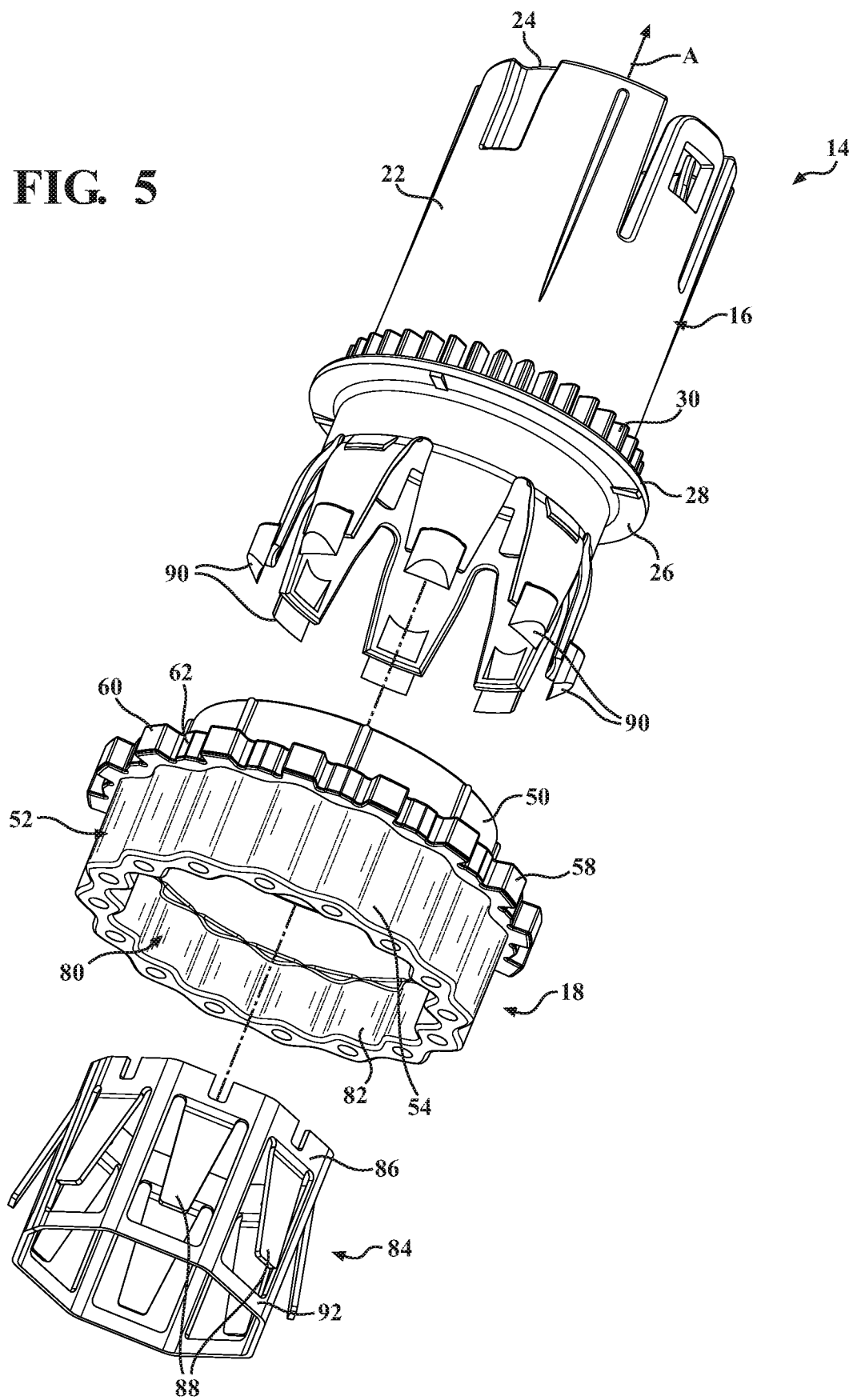
FIG. 5 is an exploded view of the rotary shifter assembly according to another embodiment of the present disclosure.
Figure 6:
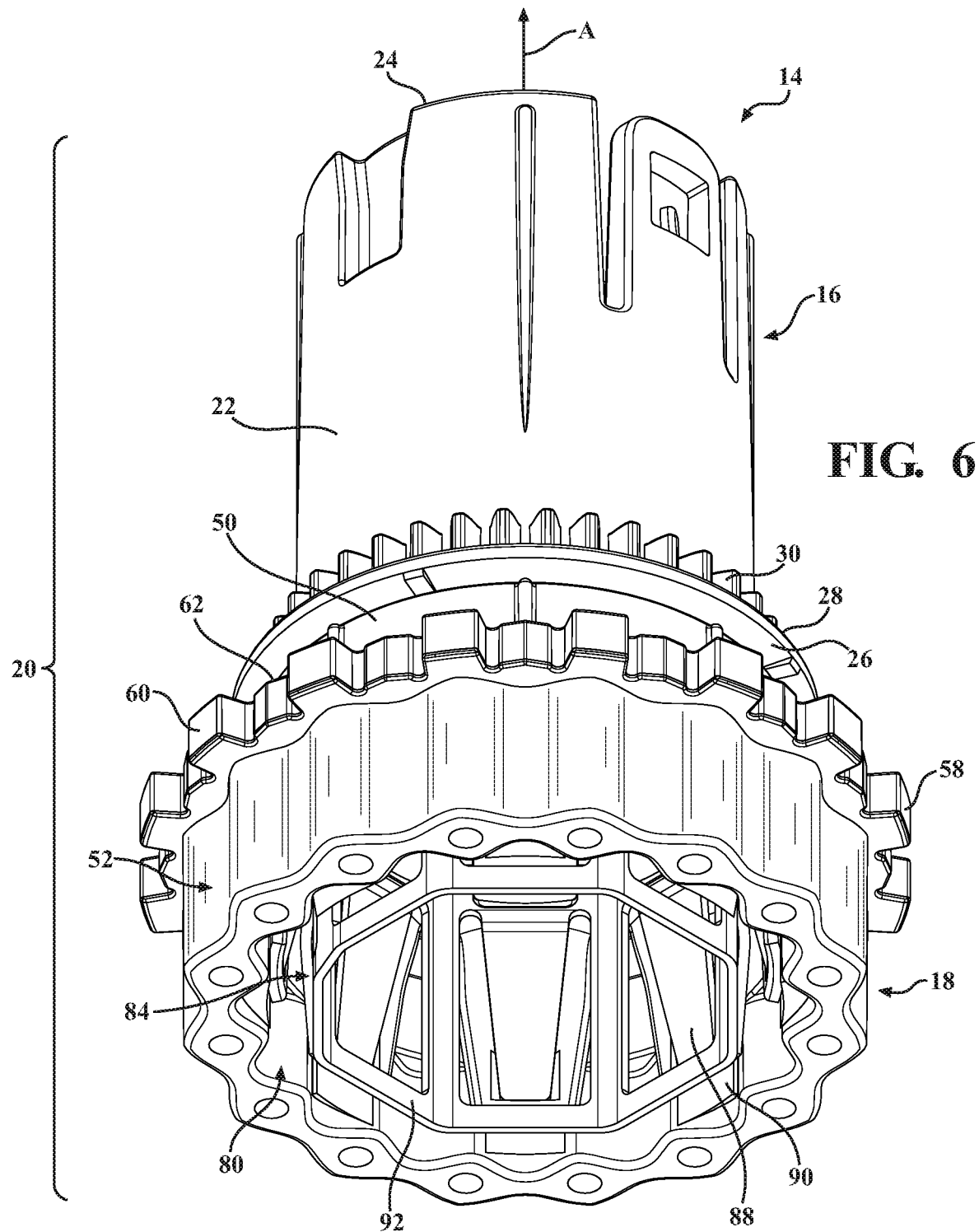
FIG. 6 is a perspective view of the rotary shifter assembly.

Referring now to FIGS. 5-6, an exploded view and a perspective view of the shifter sub-unit according to another embodiment of the present disclosure is shown. In this alternative embodiment, the biasing member 84 is a sheet metal spring. The sheet metal spring includes a base 86 and a plurality of leaves 88 extending from the base 86. Each leaf 88 has a substantially flat configuration, and is positioned against a respective one of locking fingers 90. The base 86 in combination with the leaves 88 forms a plurality of flat springs; one for each locking finger 90. Each flat spring operates to bias a respective one of the locking fingers 90 outwardly toward engagement with a fuse track 80 of overload wheel 18. The sheet metal spring further comprises a cage 92 extending from the base 86 about each leaf 88 to support the plurality of leaves 88 within the overload wheel 18.

Figure 7:
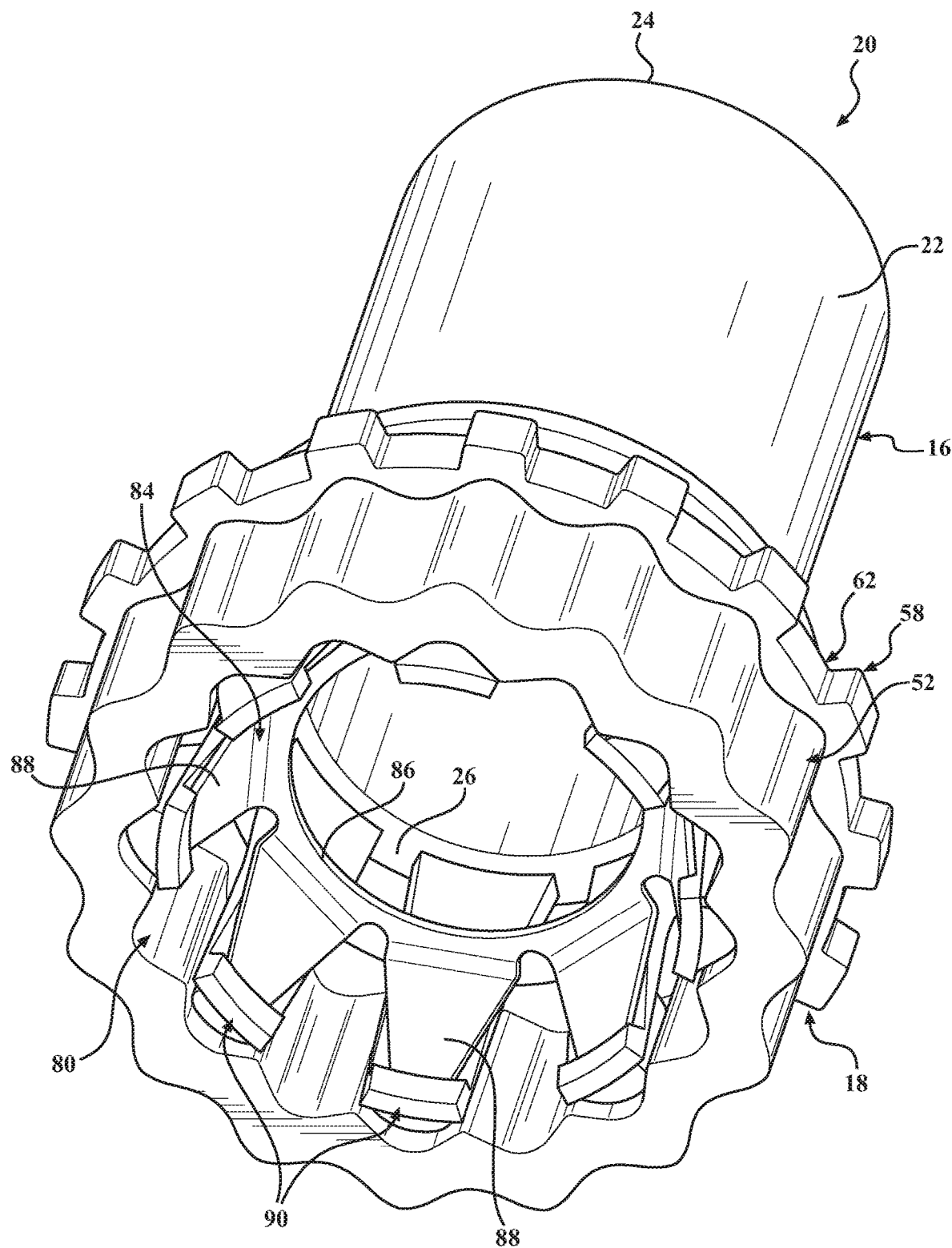
FIG. 7 is a perspective view of the rotary shifter assembly according to another embodiment of the present disclosure.

In another embodiment, and as shown in FIG. 7, the biasing member 84 is a sheet metal spring. The sheet metal spring includes a base 86 and a plurality of leaves 88 extending from the base 86. Each leaf 88 has a substantially flat configuration, and is positioned against a respective one of locking fingers 90. The base 86 in combination with the leaves 88 forms a plurality of flat springs; one for each locking finger 90. Each flat spring operates to bias a respective one of the locking fingers 90 outwardly toward engagement with a fuse track 80 of overload wheel 18.

Figure 8:
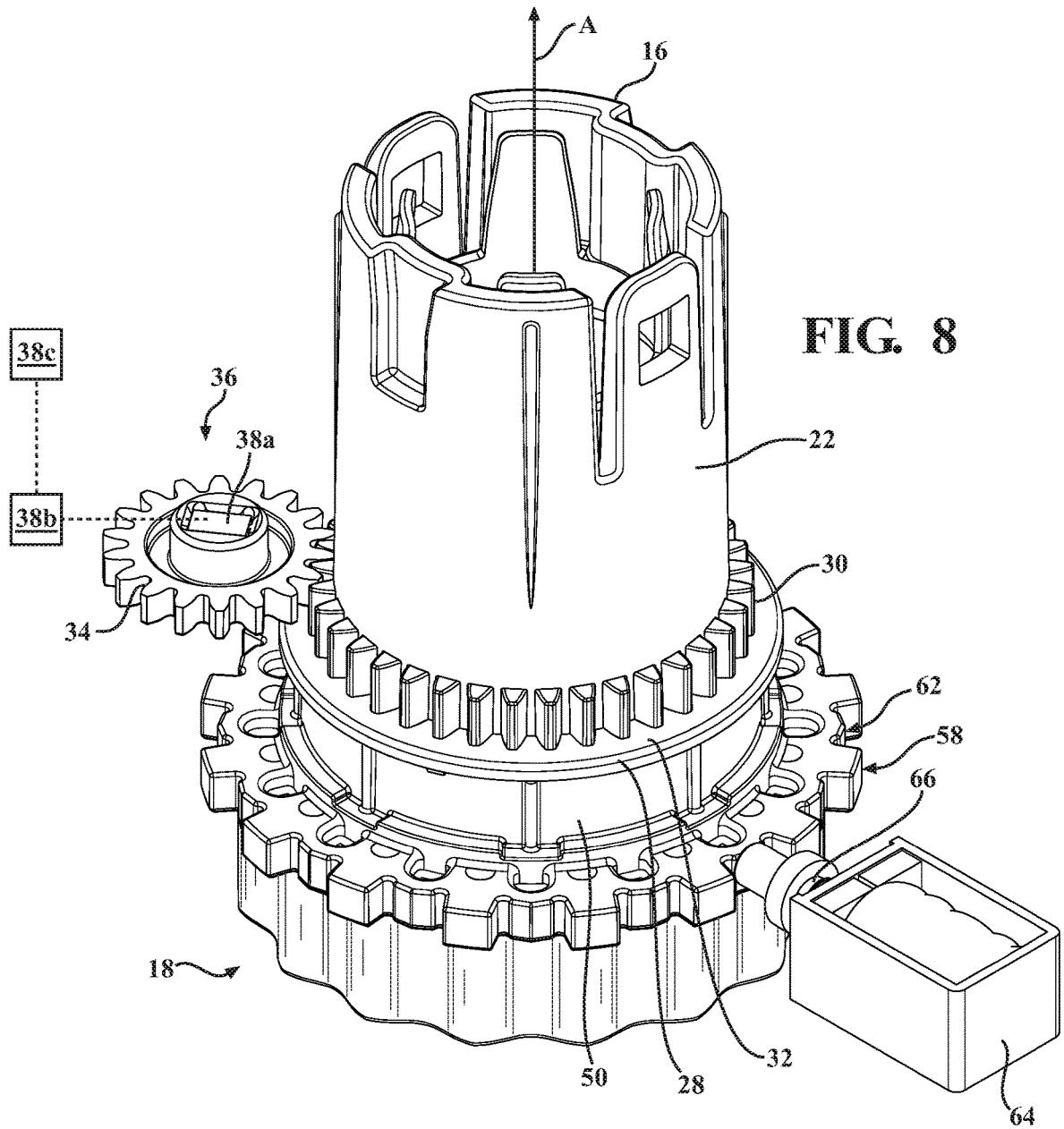
FIG. 8 is a perspective view of the rotary shifter assembly including a locking mechanism and a sensor gear.

Referring now to FIG. 8, a perspective view of the rotary shifter assembly including a locking mechanism and a sensor gear is shown. The locking mechanism may be a solenoid having a plunger (see locking mechanism 64 of FIGS. 12-14). The flange 28 extends from the body 22 a distance beyond the teeth 30 to form a ledge 32. The teeth 30 of the body 22 are configured to engage teeth 34 of a sensor gear 36 positioned adjacent the ledge 32. An emitter 38a may be rotatably coupled to the central shaft 16 in any suitable configuration to rotate in response to rotation of the central shaft 16. In some embodiments, the emitter 38a may be coupled directly to the central shaft 16. As illustrated in FIG. 8, the sensor gear 36 carries the emitter 38a, which is illustrated as magnet 38a, and the rotary shifter assembly further includes at least one sensor 38b, such as a Hall Effect sensor, disposed about the sensor gear 36. The sensor 38b interacts with the magnet 38a carried by the sensor gear 36 to detect movement (e.g., a relative rotational position) of the central shaft 16. The sensor 38b is in electrical communication with one or more controllers 38c of the vehicle that, in response to signals generated by the sensor 38b upon detecting movement of the central shaft 16, operate to control the vehicle transmission system.

Figure 9:
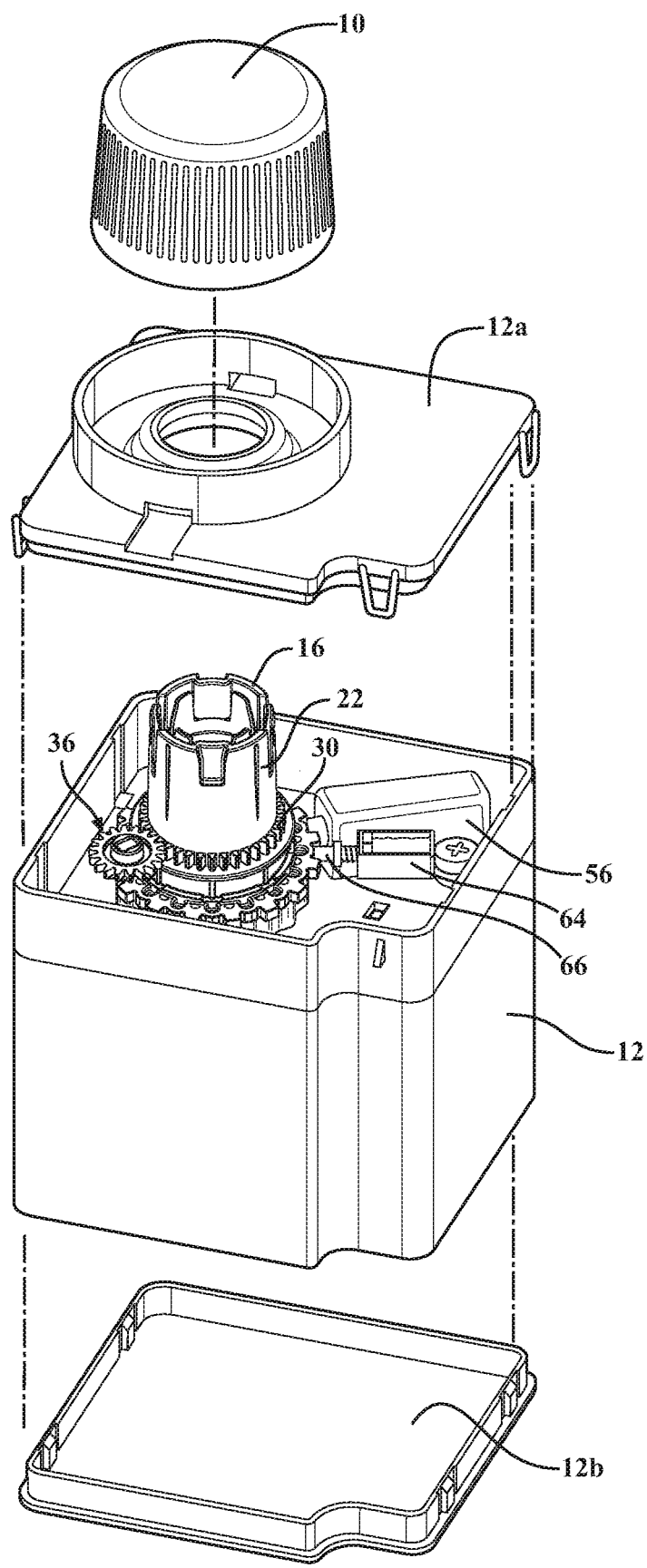
FIG. 9 is a partially exploded perspective view of the rotary shifter assembly.
Figure 10:
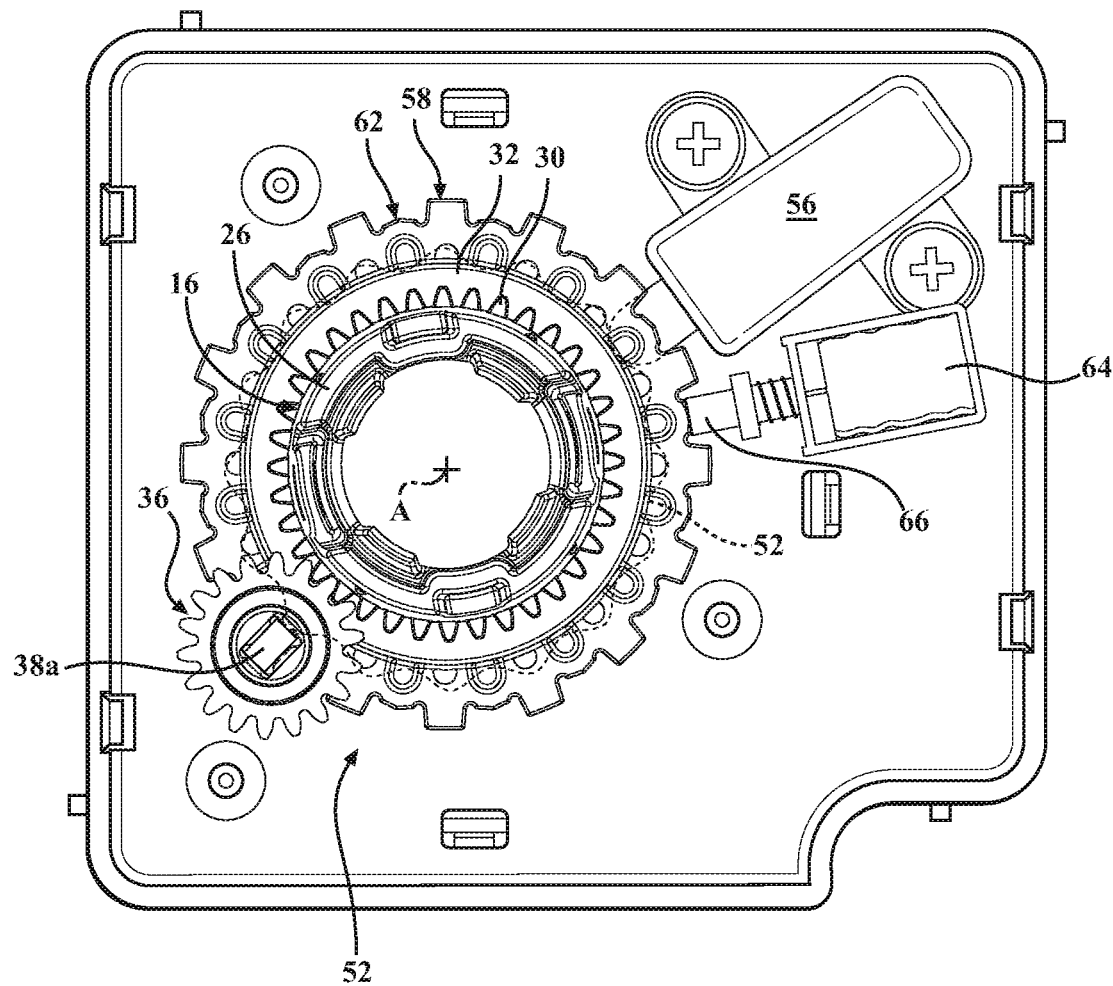
FIG. 10 is a front plan view of the rotary shifter assembly.

Referring now to FIGS. 9-10, a partially exploded perspective view and a plan view of the rotary shifter assembly are shown. The rotary shifter assembly includes a spring-loaded plunger 56 configured to engage one of the detents 54 of the detent track 52 when the shifter sub-unit 20 is moved to a radial position corresponding to an operator-selected operating mode of the transmission system during normal operation of the shifter assembly 14. For example, the plunger 56 engages one of the detents 54 when the shifter sub-unit 20 is moved into a position corresponding to the drive mode of the transmission system, engages another one of the detents 54 when the shifter sub-unit 20 is moved into a position corresponding to the reverse mode of the transmission system, etc. The plunger 56 remains in the one of the detents 54 until enough torque is applied to the central shaft 16, by the operator, to move the plunger 56 from the one detent 54 to another one of the detents 54. This occurs when the operator moves the central shaft 16 (by moving or rotating the shift knob 10) to change operating modes of the transmission system.

Figure 11:
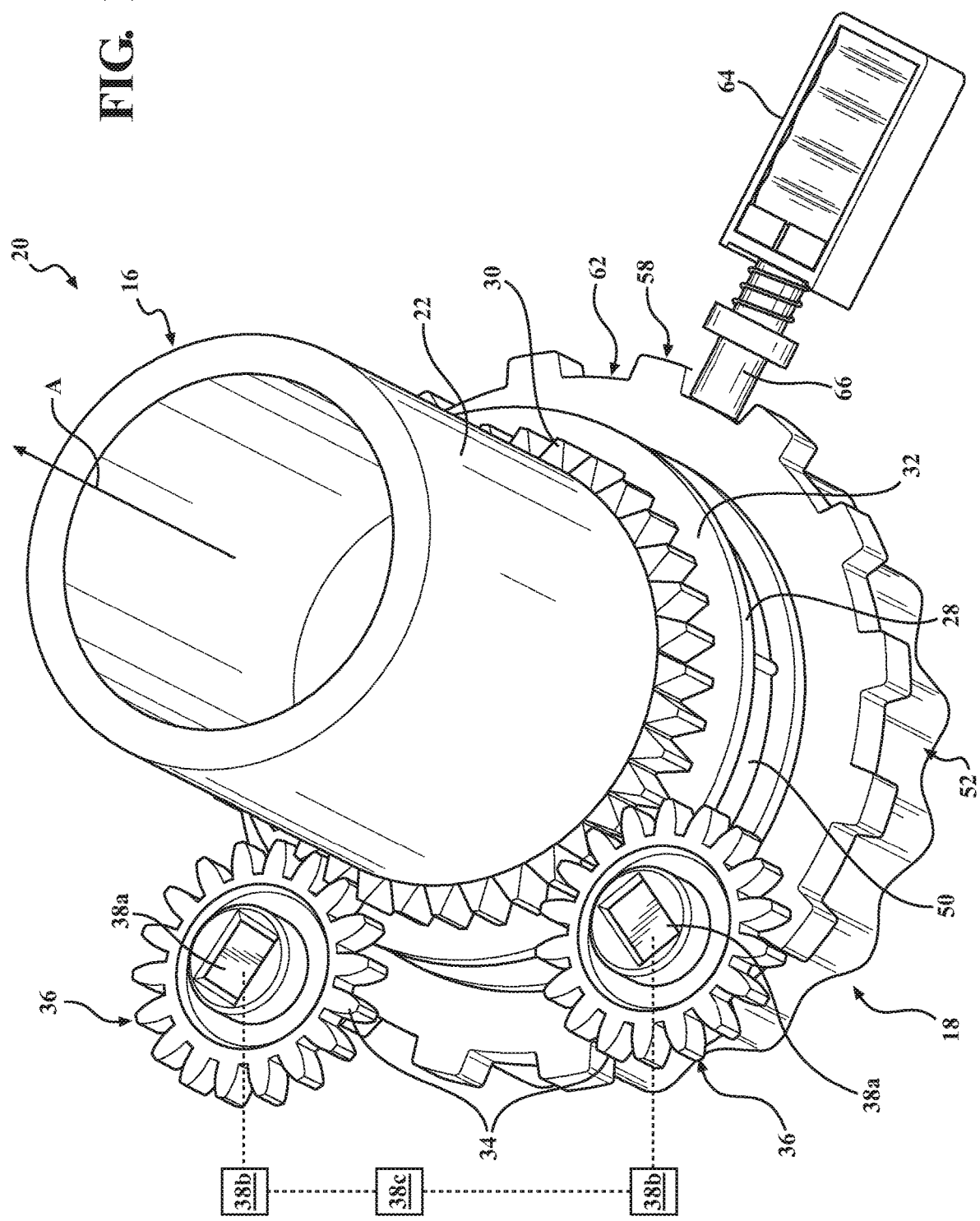
FIG. 11 is a perspective view of the rotary shifter assembly including a locking mechanism and a plurality of sensor gears.

Referring now to FIG. 11, a perspective view of the rotary shifter assembly including a locking mechanism and a plurality of sensor gears is shown. The locking mechanism may be a solenoid having a plunger (see FIGS. 12-14). The flange 28 extends from the body 22 a distance beyond the teeth 30 to form a ledge 32. The teeth 30 of the body 22 are configured to engage teeth 34 of at least one sensor gear 36 positioned adjacent the ledge 32. An emitter 38a may be rotatably coupled to the central shaft 16 to rotate in response to rotation of the central shaft 16. As illustrated in FIG. 11, the sensor gear(s) 36 carries the emitter 38a, which is illustrated as magnet 38a, and the rotary shifter assembly further includes at least one sensor 38b, such as a Hall Effect sensor or an optical sensor, disposed about the sensor gear(s) 36. The sensor(s) 38b interacts with the magnet(s) 38a carried by the sensor gear(s) 36 to detect movement (e.g., a relative rotational position) of the central shaft 16. The sensor(s) 38a is in electrical communication with one or more controllers 38c of the vehicle that, in response to signals generated by the sensor(s) 38b upon detecting movement of the central shaft 16, operate to control the vehicle transmission system.

In some embodiments, such as those shown in FIGS. 8 and 11, the sensor(s) 38b may also detect that the transmission is not in a normal operating mode (e.g., an override function or mode has occurred wherein the central shaft 16 and the overload wheel 18 are not rotating as a unit). The sensor(s) 38b may store and/or send this information to third parties, and may optionally trigger a message to be sent to the user (e.g., instructing the user to contact a vehicle service station or take other appropriate actions).

Figure 12:
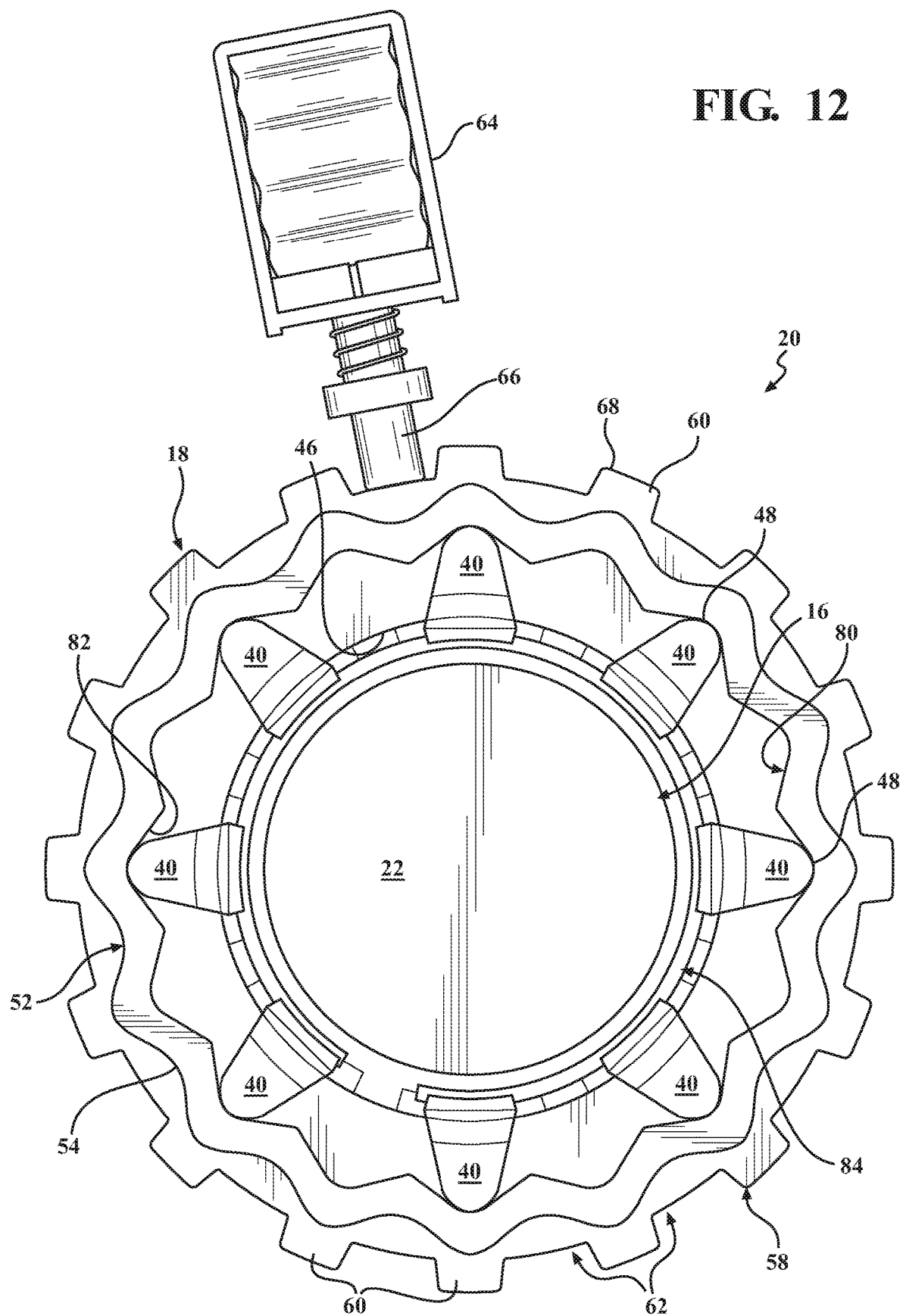
FIG. 12 is an end view of the rotary shifter assembly including the locking mechanism in a first radial position.

Referring now to FIG. 12, an end view including the locking mechanism showing the rotary shifter assembly in a first radial position is illustrated. The overload wheel 18 has a locking flange 58 extending outwardly from the base portion 50. In certain embodiments, the locking flange 58 has a plurality of tabs 60 and defines a notch 62 between each pair of adjacent tabs 60. The rotary shifter assembly further includes a locking mechanism 64 engaging the overload wheel 18 to selectively prevent and allow concurrent rotation of the overload wheel 18 and the central shaft 16 during normal operational modes. The locking mechanism 64 may comprise moveable parts (e.g., a solenoid with a plunger), fixed parts (e.g., tabs), or any suitable configuration comprising a combination of moveable and fixed parts. In the embodiment shown in FIG. 12, the locking mechanism 64 is a solenoid having a plunger 66 movable between a lock position in which the plunger 66 engages the locking flange 58 (by being received in one of the notches 62 and engaging one of the tabs 60) to prevent rotation of the overload wheel 18 under certain operating conditions or modes, such as in park, and an unlock position in which the plunger 66 disengages the locking flange 58 to permit rotation of the overload wheel 18. The plunger 66 moves to the unlock position during a proper change of the operating condition or mode.

As best shown in FIG. 12, and in one embodiment, each one of the tabs 60 defines a pair of stops 68, and the plunger 66 has an end 70 that is partially received within one of the notches 62 and engages one of the stops 68 when the plunger 66 is moved (such as rotated about a center portion 72 of the plunger 66) into the lock position. Additionally, the plunger 66 is configured to prevent rotation of the overload wheel 18 in one direction. The plunger 66 could also be configured to permit rotation of the overload wheel 18 in the opposite direction. For example, the configuration of the plunger 66 enables engagement of the end 70 of the plunger 66 with one of the stops 68 to prevent rotation of the overload wheel 18 in the counter-clockwise direction as shown in FIG. 12. It is possible that the configuration of the plunger 66 could also permit rotation of the overload wheel 18 in the clockwise direction.

Referring again to FIG. 12, the overload wheel 18 further includes a fuse track 80 having a plurality of locking recesses 82. In the illustrated embodiment, the fuse track 80 is adjacent to or disposed about the inner surface 46 of the base portion 50 and opposite the detent track 52. Alternatively, the fuse track 80 could be offset from the detent track 52. For example, the fuse track 80 could be spaced from the base portion 50 of the overload wheel 18, and the detent track 52 could be disposed between the fuse track 80 and the base portion 50. Other arrangements of the fuse track 80 and the detent track 52 are also contemplated.

The locking fingers 40 of the central shaft 16 are configured to engage the locking recesses 82 to couple the central shaft 16 to the overload wheel 18 to form the shifter sub-unit 20. For example, in some embodiments, engaging surface 48 of each locking finger 40 of the central shaft 16 faces and engages a respective one of the plurality of locking recesses 82 of the fuse track 80 to couple the central shaft 16 to the overload wheel 18. In the preferred embodiment, only the head 44 of the locking finger 40 engages the locking recesses 82.

The rotary shifter assembly further includes a biasing member 84 disposed within the overload wheel 18 and positioned adjacent to or abutting the fingers 40 of the central shaft 16. The biasing member 84 is configured to continually bias the fingers 40 outwardly toward engagement with the fuse track 80 of the overload wheel 18. In the embodiment shown in FIG. 12-14, the biasing member 84 is a circular spring positioned adjacent the locking fingers 40 proximate the head 44 of each finger 40. The locking fingers 40 could define a groove, and the circular spring could be seated or positioned within the groove.

Referring again to FIG. 12, during normal operation of the shifter assembly 14, the central shaft 16 and the overload wheel 18 move together as a unit (i.e., the shifter sub-unit 20) when the shift knob 10 is actuated by the vehicle operator to change operational modes of the vehicle transmission system.

Figure 13:
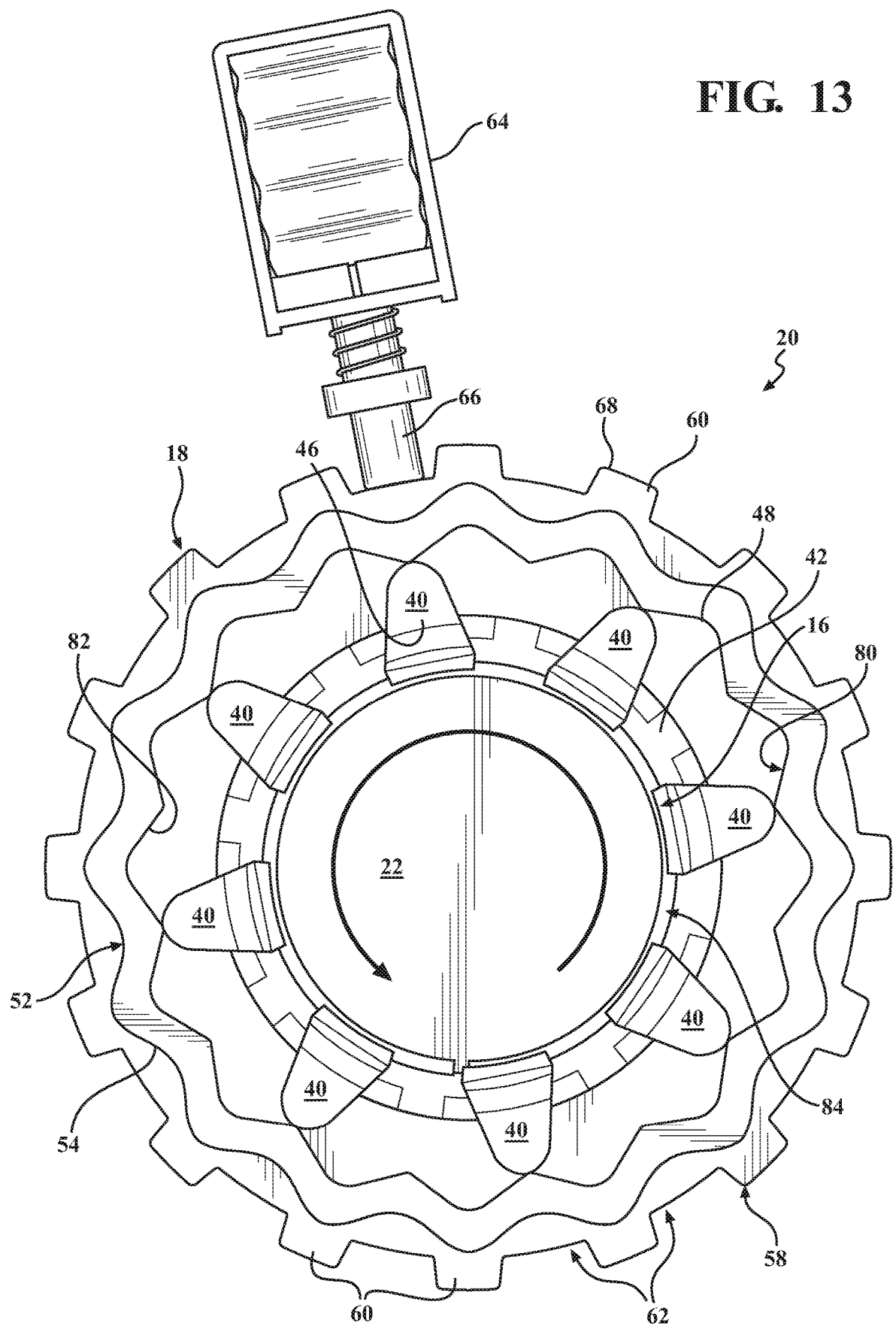
FIG. 13 is an end view of the rotary shifter assembly in a second radial position.

Referring now to FIG. 13, an end view showing the rotary shifter assembly in a second radial position is illustrated. Irregular operation of the shifter assembly 14 may occur when an extreme torque is applied to the central shaft 16 beyond a maximum torque threshold, which may be applied by the vehicle operator in instances where the rotary shifter assembly gets stuck such as during a malfunction of the locking mechanism 64. When the extreme torque is applied, the central shaft 16 detaches from and can move independent of the overload wheel 18. For example, when the extreme torque is applied, the central shaft 16 rotates causing the stem 42 of each of the locking fingers 40 to flex inwardly against the biasing force of the biasing member 84. The engaging surface 48 rides along the contour of the locking recess 82 of the fuse track 80 and out of engagement with the locking recess 82. With independent movement of the central shaft 16 relative to the overload wheel 18, the central shaft 16 rotates in response to the applied torque while the overload wheel 18 remains in the position corresponding to the then-current operating mode of the transmission system. This way, the vehicle is still operable even though an irregular operation of the shifter assembly 14 has occurred. Additionally, the sensor(s) 38b carried by the sensor gear(s) 36 detects the position of the central shaft 16 enabling continued use of the shifter assembly 14 after an irregular operation of the shifter assembly 14 has occurred.

Figure 14:
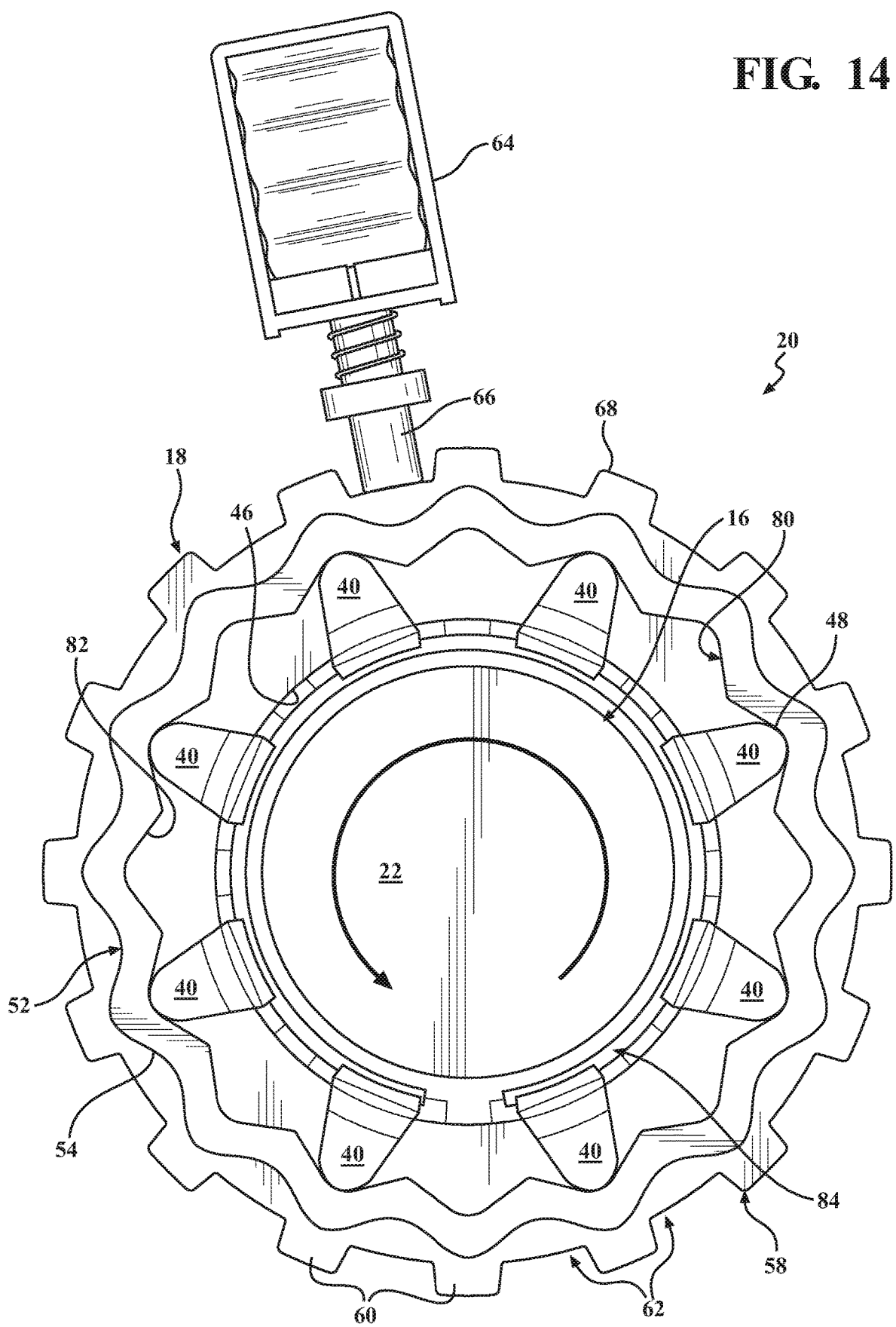
FIG. 14 is an end view of the rotary shifter assembly in a third radial position.

Referring now to FIG. 14, an end view of the rotary shifter assembly in a third radial position is illustrated. Once the force is again below the maximum torque threshold, the central shaft 16 automatically returns to concurrent rotation relative to the overload wheel 18.

Figure 15:
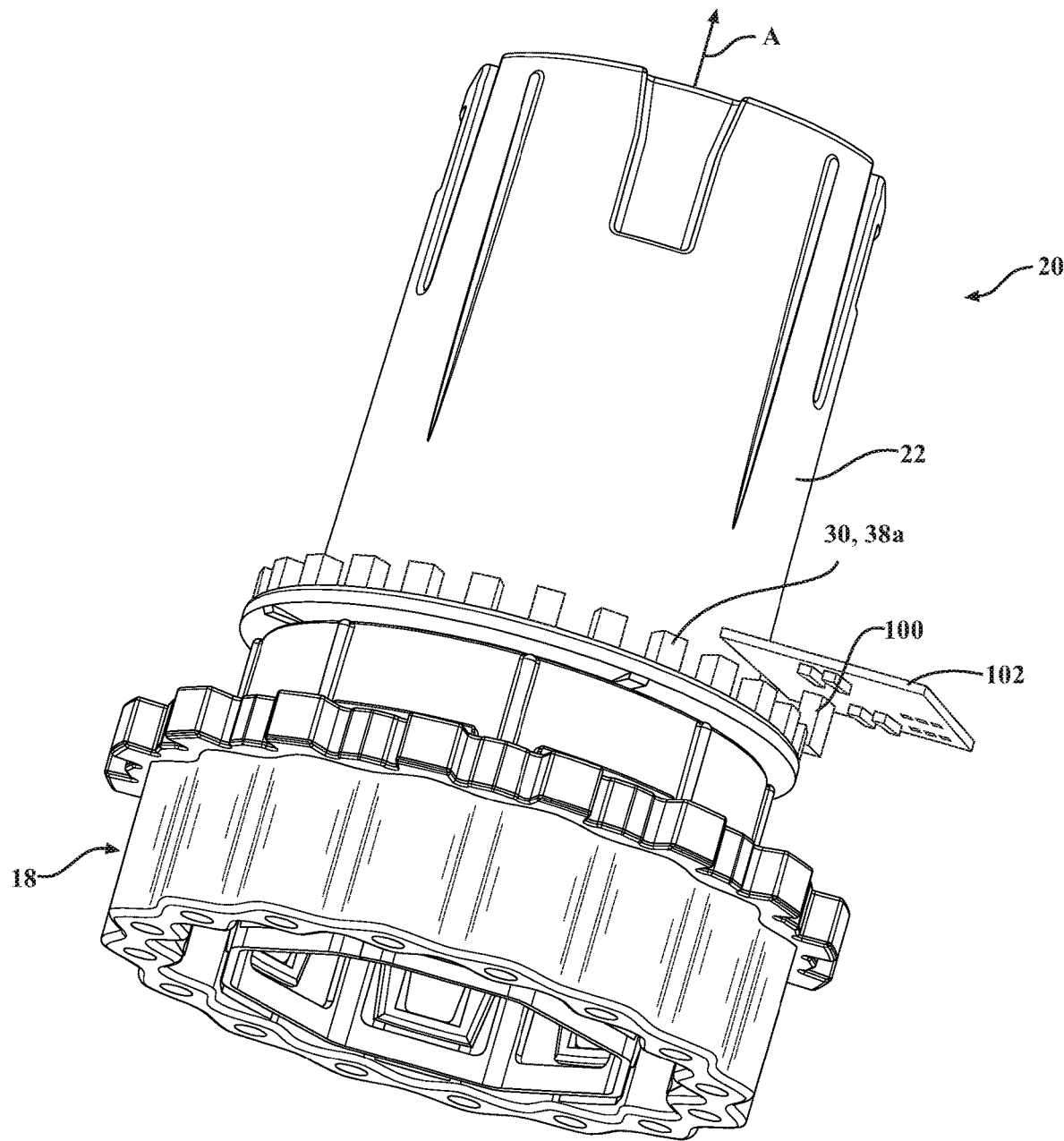
FIG. 15 is a perspective view of the rotary shifter assembly including a sensor on a printed circuit board.

Referring now to FIG. 15, a perspective view of the rotary shifter assembly including a sensor on a printed circuit board is shown. Emitters 38b may be arranged in any suitable configuration to be read by an optical sensor 100. By way of example and not limitation, emitters 38b may comprise distinct colors or have other distinct markings. In FIG. 15, emitters 38b are arranged as teeth 30. The optical sensor 100 may be coupled to a printed circuit board 102, which may be coupled to the housing 12 (see FIGS. 9-10). The optical sensor 100 may be in electrical communication with one or more controllers (e.g., controller 38c, as shown in FIGS. 8, 11) of the vehicle that, in response to signals generated by the optical sensor 100 upon detecting movement of the central shaft 16, operate to control the vehicle transmission system.

Figure 16:
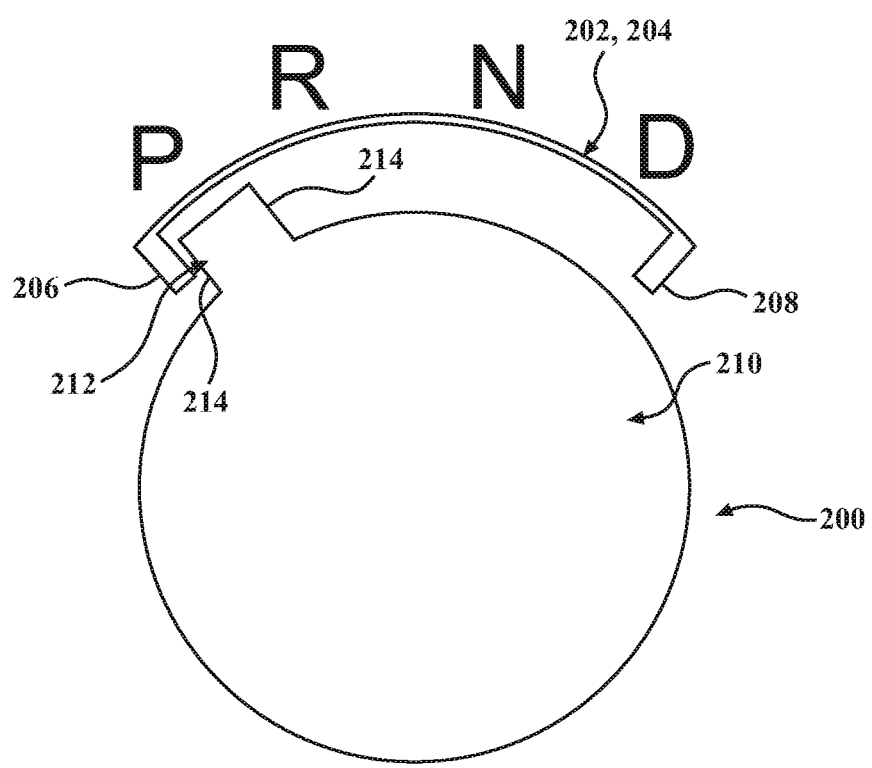
FIG. 16 is a schematic illustration of a portion of the rotary shifter assembly according to yet another embodiment of the present disclosure.

Referring now to FIG. 16, a perspective view of a portion of the rotary shifter assembly according to another embodiment of the present disclosure is shown. In this alternative embodiment, the shifter sub-unit 200 is disposed within or supported by a housing 202. The housing 202 also functions as a fixed or static locking mechanism 204 having first projection 206 and second projection 208, which may be ends of a gear shift pattern (for example, P, R, N, D). An overload wheel 210 defines a single tab 212 defining stops 214, with one of the stops 214 configured to engage the first projection 206 to restrict rotation of the rotary shifter assembly in the counter-clockwise direction. The other stop 214 is configured to engage the second projection 208 to restrict rotation of the rotary shifter assembly in the clockwise direction. In an alternative embodiment, the overload wheel 210 functions as the fixed or static locking mechanism 204 having projections 206, 208. In this embodiment, the housing 202 may define tab 212 and stops 214 that are configured to engage projections 206, 208 of the overload wheel 210 to restrict rotation of the rotary shifter assembly.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotary shifter assembly for changing gears in a vehicle transmission, said rotary shifter assembly comprising:
    a housing;
    a shaft rotatably supported in said housing and selectively movable between a plurality of radial positions for indicating a desired gear change, with said shaft having a first end and a second end;
    a shift knob coupled to said first end of said shaft for actuation by a user to the desired gear change;
    a plurality of locking fingers at least partially extending axially from said second end of said shaft;
    an overload wheel at least partially disposed about said locking fingers with said locking fingers directly engaging said overload wheel to couple said overload wheel with said shaft for concurrent rotation as a unit during a normal operational mode of the shifter assembly for performing the desired gear change; and
    a locking mechanism engaging said overload wheel to selectively prevent and allow said concurrent rotation of said overload wheel and said shaft during said normal operational mode of the shifter assembly; and
    wherein said locking fingers are flexible and capable of moving relative to said overload wheel to permit temporary rotation of said shaft relative to said overload wheel when a force applied to said shaft is beyond a maximum torque threshold, and automatically returning to said concurrent rotation once the force is below the maximum torque threshold.

2. The rotary shifter assembly of claim 1, further comprising:
    an emitter rotatably coupled to said shaft to rotate in response to rotation of said shaft, and
    at least one sensor in communication with said emitter to detect said rotation of said emitter.

3. The rotary shifter assembly of claim 1, wherein said shaft defines a plurality of teeth, and further comprising at least one sensor gear having a plurality of teeth engaging said plurality of teeth of said shaft.

4. The rotary shifter assembly of claim 3, further comprising an emitter mounted to said sensor gear.

5. The rotary shifter assembly of claim 4, wherein said at least one sensor gear is a first sensor gear, and further comprising a second sensor gear having a plurality of teeth engaging said plurality of teeth of said shaft with said second sensor gear spaced from said first sensor gear, and further comprising a second emitter mounted to said second sensor gear.

6. The rotary shifter assembly of claim 2, wherein said emitter comprises a magnet and wherein said at least one sensor comprises a Hall Effect sensor.

7. The rotary shifter assembly of claim 2, wherein said emitter is mounted to said shaft for concurrent rotation with said shaft.

8. The rotary shifter assembly of claim 7, wherein said sensor is an optical sensor.

9. The rotary shifter assembly of claim 1, wherein said overload wheel further comprises a fuse track having a plurality of locking recesses, and said locking fingers engaging said recesses of said fuse track.

10. The rotary shifter assembly of claim 1, wherein said overload wheel further comprises a detent track having radially spaced detents each representing respective radial positions of said shifter, and wherein the rotary shifter assembly further comprises a detent plunger engaging one of said radially spaced detents to define a selected radial position of said shifter.

11. The rotary shifter assembly of claim 9, wherein said overload wheel has a base portion, with said base portion defining an inner surface and an outer surface, and said fuse track disposed about said inner surface, and wherein said overload wheel further comprises a detent track having radially spaced detents disposed about said outer surface with said fuse track disposed opposite said detent track on said overload wheel.

12. The rotary shifter assembly of claim 1, wherein each of said plurality of locking fingers comprises a stem extending axially from said shaft and flexible inwardly toward a center of said shaft, and a head extending from said stem with said head having an engaging surface facing away from said center of said shaft.

13. The rotary shifter assembly of claim 1, further comprising a biasing member disposed within said overload wheel and positioned adjacent to said plurality of locking fingers to continuously bias said locking fingers.

14. The rotary shifter assembly of claim 13, wherein said overload wheel further comprises a fuse track, and wherein said biasing member biases said plurality of locking fingers outwardly to engage with said fuse track.

15. The rotary shifter assembly of claim 13, wherein said biasing member comprises one of a circular spring and a sheet metal spring.

16. The rotary shifter assembly of claim 15, wherein said sheet metal spring comprises a base and a plurality of leaves extending from said base.

17. The rotary shifter assembly of claim 16, wherein each of said plurality of leaves is positioned against a respective one of said plurality of locking fingers, and wherein each one of said plurality of leaves corresponds to one of said plurality of locking fingers.

18. The rotary shifter assembly of claim 16, wherein said sheet metal spring comprises a cage extending from said base about each of said leaves to support said plurality of leaves within said overload wheel.

19. The rotary shifter assembly of claim 1, wherein:
    said locking mechanism comprises a solenoid having a plunger,
    said overload wheel further comprises a locking flange, and
    said plunger moves between a lock position engaging said locking flange of said overload wheel to prevent rotation of said overload wheel in at least one direction, and an unlock position disengaged with said locking flange to permit rotation of said overload wheel in an at least one direction.

20. A method of operating a rotary shifter assembly having a housing, a shaft, a shift knob mounted to one end of the shaft, a plurality of locking fingers mounted to another end of the shaft and at least partially extending axially from the shaft, an overload wheel at least partially disposed about the locking fingers with the locking fingers directly engaging the overload wheel, and a locking mechanism, said method comprising the steps of:

rotating the shaft between a plurality of radial positions to indicate a desired gear change for changing gears in a vehicle transmission;

concurrently rotating the overload wheel with the shaft as a unit during the step of rotating the shaft through the direct engagement of the locking fingers during a normal operational mode of the shifter assembly for performing the desired gear change;

selectively engaging the locking mechanism with the overload wheel to selectively prevent and allow the concurrent rotation of the overload wheel and the shaft during the normal operational mode of the shifter assembly; and moving the locking fingers relative to the overload wheel to permit temporary rotation of the shaft relative to the overload wheel when a force applied to the shaft is beyond a maximum torque threshold, and automatically returning to the concurrent rotation once the force is below the maximum torque threshold.

21. The method of operating the rotary shifter as set forth in claim 20, further comprising an emitter, and further including the step of rotating the emitter during rotation of the shaft.

22. The method of operating the rotary shifter as set forth in claim 20, wherein the overload wheel further comprises a fuse track having a plurality of locking recesses, and wherein the step of moving the locking fingers relative to the overload wheel is further defined as moving the locking fingers temporarily out of the locking recesses.

23. The method of operating the rotary shifter as set forth in claim 22, further including the step of continuously biasing the locking fingers into the fuse track.

24. A system for changing gears in a vehicle transmission of a vehicle comprising:

a support;

a housing mounted to said support;

a shaft rotatably supported in said housing and selectively movable between a plurality of radial positions for indicating a desired gear change, with said shaft having a first end and a second end;

a shift knob coupled to said first end of said shaft for actuation by a user to the desired gear change;

a plurality of locking fingers at least partially extending axially from said second end of said shaft;

an overload wheel at least partially disposed about said locking fingers with said locking fingers directly engaging said overload wheel to couple said overload wheel with said shaft for concurrent rotation as a unit during a normal operational mode of the shifter assembly for performing the desired gear change; and a locking mechanism engaging said overload wheel to selectively prevent and allow said concurrent rotation of said overload wheel and said shaft during said normal operational mode of the shifter assembly; and wherein said locking fingers are flexible and capable of moving relative to said overload wheel to permit temporary rotation of said shaft relative to said overload wheel when a force applied to said shaft is beyond a maximum torque threshold, and automatically returning to said concurrent rotation once the force is below the maximum torque threshold.

\* \* \* \* \*